United States Patent
Cannalire et al.

[11] Patent Number: 5,418,849
[45] Date of Patent: May 23, 1995

[54] PROCEDURE AND DEVICE FOR ADAPTIVE DIGITAL CANCELLATION OF THE ECHO GENERATED IN TELEPHONE CONNECTIONS WITH TIME-VARIANT CHARACTERISTICS

[75] Inventors: Giacomo Cannalire, Cassano D'Adda; Giacomo Premoli, Milan; Roberto Ravasio, Bergamo, all of Italy

[73] Assignee: Siemens Telecomunicazioni S.p.A., Milan, Italy

[21] Appl. No.: 870,179

[22] Filed: Apr. 16, 1992

Related U.S. Application Data

[63] Continuation-in-part of Ser. No. 446,023, Dec. 5, 1989, abandoned.

[30] Foreign Application Priority Data

Dec. 21, 1988 [IT] Italy .................................. 23032A88

[51] Int. Cl.⁶ .............................................. H04B 3/23
[52] U.S. Cl. .................................. 379/410; 379/406; 370/32
[58] Field of Search ................ 379/406, 410, 411; 370/32, 32.1

[56] References Cited

U.S. PATENT DOCUMENTS

| | | | |
|---|---|---|---|
| 4,321,686 | 3/1982 | Horna | 379/410 |
| 4,578,543 | 3/1986 | LeBourlot et al. | 379/410 |
| 4,912,758 | 3/1990 | Arbel | 379/411 |
| 4,926,472 | 5/1990 | Batruni et al. | 379/411 |
| 4,970,715 | 11/1990 | McMahan | 379/410 |
| 4,982,428 | 1/1991 | Agazzi et al. | 379/411 |

OTHER PUBLICATIONS

Digital Communications by John Proakis, published by International Student Editions, pp. 413–417.

*Primary Examiner*—James L. Dwyer
*Assistant Examiner*—M. Shehata
*Attorney, Agent, or Firm*—Adel A. Ahmed

[57] ABSTRACT

A procedure and device are described for cancellation of the echo produced in telephone connections with electrical time-variant characteristics such as for example those affected by phase roll. The echo canceller obtained in accordance with the procedure which is the object of this invention produces an estimate of the echo signal by means of appropriate digital filtering of the signal originated by the far-end talker. The estimated echo is then subtracted from the actual echo. Filtering is activated by an IIR digital filter whose adaptive coefficients are updated by use of an adaptive algorithm based on decimation of the square error. The high convergence speed of said algorithm in the calculation of the coefficient correction step allows a correct estimate of the echo even in case of connections affected by phase roll.

15 Claims, 5 Drawing Sheets

PROCEDURE AND DEVICE FOR ADAPTIVE DIGITAL CANCELLATION OF THE ECHO GENERATED IN TELEPHONE CONNECTIONS WITH TIME-VARIANT CHARACTERISTICS

CROSS-REFERENCE TO RELATED APPLICATION

This is a continuation-in-part of Ser. No. 07/446,023, filed Dec. 5, 1989, now abandoned.

FIELD OF THE INVENTION

The present invention relates to the field of signal transmission on telephone lines and in particular to a procedure and device for adaptive digital cancellation of the echo generated in telephone connections with time-variant characteristics.

DESCRIPTION OF THE RELATED ART

It is known that telephone signals travel on lines which can be considered 1-way or 2-way telephone lines depending on the direction of travel thereof.

2-way lines, also called 2-wire lines, are generally used locally, mainly for the connection of telephone sets to the associated exchange.

1-Way lines, also called 4-wire lines regardless of the physical nature of the medium supporting them, are used generally for connections between telephone exchanges placed even at a considerable distance apart. In this case the connection can include sections by cable and/or radio link and either terrestrial or satellite.

As is known the coupling between a 2-way line and the corresponding 1-way lines for transmission and reception respectively is activated by the so-called hybrid coil.

For a connection to be complete it must include at least two hybrid coils. Each one accomplishes conversion from 2-wire line to 4-wire line and the reverse.

It is known that the hybrid coil has four ports, one connected to the 2-way line which costitutes the telephone pair, a second port connected to the 1-way transmission line, a third port connected to the 1-way reception line and a fourth port connected to a so-called balancing impedance.

Operation of the hybrid coil can be understood by examining the specific case in which for all the frequencies included in the voice band the impedance it presents at its ports is equal to that of the load connected to the respective ports. In this case the power present on the telephone pair is divided exactly in half between the 1-way transmission line and the balancing impedance. Similarly and independently the power present on the 1-way reception line is divided exactly in half between the telephone pair and the balancing impedance to allow separation of the transmitted signals from those received.

However this case is purely ideal. In practice coupling to the various ports of the hybrid coil is never perfect and the ensuing unbalancing causes signal reflection between them.

In particular part of the voice signal present at the reception port of the hybrid coil and coming from the far-end talker is transferred to the transmission port and thence back to the same talker who, while he is still talking, listens to what he said with delay equal to the time taken by the voice signal to complete the path from the remote hybrid coil and return.

The signal fraction played back is the echo of the signal transmitted and the path the echo completes from the point of generation to the point of listening is called 'echo channel'.

It has been proven that the effects of the echo are annoying for delays over a few tens of milliseconds and echo channel attenuations between 6 dB and 15 dB if appropriate corrective devices such as the so-called 'echo cancellers' are not adopted. These devices are usually inserted in 4-wire lines connected to an international exchange and blank the echo produced during the conversation by subtracting from the actual echo signal an estimate thereof.

Causes of unsteadiness can occur in the echo channel whose impulse response becomes a function variable in time and can significantly influence the performance of the canceller.

This phenomenon occurs in FDM-SSB-SC systems with a single physical communication route which transmits in both directions using carriers with different frequencies.

The modulation and demodulation frequencies of the carrier system, being generated locally, are not synchronized. This can cause a shift in the frequency of all the spectral components of the echo signal in relation to the signal sent.

This phenomenon, called 'phase roll', causes unsteadiness of the echo channel.

In accordance with the international trend in the matter as established for example by CCITT recommendation 311 the frequency shift between the two ends of a connection should not exceed 2 Hz each way. Consequently the upper limit for total frequency shift on the echo path is 4 Hz.

Echo cancellers presently known in the art usually use for the abovesaid estimate of the echo signal a transversal digital filter with adaptive coefficients which recopies the impulse response of the echo channel.

The estimate of the echo is obtained by the convolution process between the voice of the far-end talker and the impulse response of the transversal filter. The residual echo is obtained by subtracting the estimated echo from the actual echo.

The variations of the filter coefficients are defined by an optimization criterion and are realized by an adaptation algorithm.

The optimization criterion is usually based on minimization of the mean quadratic error or minimization of the power of the residual echo.

The adaptation algorithm is an iterative method which allows calculation of the coefficients by adding to the present value a correction proportional to the cross correlation sequence between the voice sample of the far-end talker corresponding to the coefficient under examination and the residual echo sample.

Echo cancellers suppress the echo signal only if it is lower than a predetermined threshhold by means of a nonlinear circuit called 'center clipper'.

In addition they have a double-talking detector circuit which, in the presence of the voice of the near-end talker, inhibits both updating of the coefficients of the transversal filter and operation of the center clipper so that it will not cut off said voice.

The echo cancellers carried out in accordance with the known art with a very long transversal filter have the serious drawback of low convergence speed if designed to produce an accurate estimate of the echo and of being inaccurate if sized to have high convergence speed.

These limitations allow use of said echo cancellers only in connections with stationary characteristics.

In connections affected by phase roll they are not usable because the rapid variations in time of the spectral characteristics of the echo signal do not allow the adaptation algorithm, because of its slowness, to converge toward the appropriate values of the coefficients of the filter whih varying time.

More recently, in order to reduce the number of arithmetical operations of the selected algorithm for the adaptation and to solve the problem of echo cancellation for connections of any distance affected by phase roll, there was developed an echo canceller based on a procedure described in the text of Italian patent application no. 68047-A/83, inventors R. Montagna and L. Nebbia, filed in the name of CSELT on 12 Oct. 1983.

This canceller makes use of the fact that the impulse responses of the echo channels are characterized by a pure propagation delay followed by a zone approximately 6 ms wide in which the impulse response is significantly different from zero. Consequently in accordance with the abovementioned procedure the echo signal propagation delay is evaluated for the purpose of adopting a short transversal filter whose coefficients correspond only with the significant part of the impulse response.

The limited number of coefficients to be updated makes the canceller faster in producing the echo estimate, also allowing use thereof in connections affected by a limited phase roll.

Although the abovementioned canceller has better performance than previous ones in connections affected by phase roll it is not capable of maintaining good operating performance in the presence of sustained phase rolls, e.g. on the order of 4 Hz.

SUMMARY OF THE INVENTION

Accordingly the object of the present invention is to overcome the abovesaid drawbacks and indicate a procedure for cancelling the echo generated in telephone connections affected by phase roll.

The procedure in question estimates echo signal propagation delay in order to allow a simulation of the impulse response of the echo channel applicable only to the significant part thereof.

Said simulation is activated by a recursive digital filter with adaptive coefficients and allows securing of an estimate of the echo signal by causing samples of the voice signal of the far-end talker appropriately delayed and samples of the echo signal to reach the inputs of the filter.

The estimated echo is then subtracted from the actual echo to eliminate therefrom bothersome listening effects.

The filter coefficient adaptation algorithm is based on the minimization criterion of the mean square error or minimization of the power of the residual echo. Said algorithm is applied in an innovative manner termed 'square error decimation' which consists basically of adopting a square error calculation iteration frequency equal to the sampling frequency of the digital signals placed at the inputs of the filter divided by a decimation factor indicated hereinafter by the symbol M.

The echo channel has a transfer function comprising poles and zeros. Therefore desiring to simulate it with a transversal filter whose transfer function includes only zeros it would be necessary to considerably increase the number of coefficients of the filter without however obtaining a very accurate estimate. But by using the recursive filter, whose transfer function includes poles and zeros, it is possible to obtain a very accurate estimate of the echo channel transfer function.

The adaptation algorithm implemented has a higher convergence speed than the algorithm of the gradient method used in conventional echo cancellers. Therefore the echo canceller obtained in accordance with the implemented algorithm is capable of operating while maintaining good performance even in the presence of a 4 Hz phase roll.

Square error decimation allows reduction of the number of arithmetic operations necessary for each calculation cycle of the adaptive coefficients to obtain more echo cancellers and optimize the use of microprocessors specialized in digital signal processing.

To attain said results the present invention has for its object a procedure and a device for adaptive digital cancellation of the echo generated in telephone connections with time-variant characteristics as described in claim 1.

BRIEF DESCRIPTION OF THE DRAWINGS

Other purposes and advantages of the present invention will be made clear by the following detailed description of an example of accomplishment thereof and by the annexed drawings given merely for explanatory and nonlimiting purposes wherein.

DETAILED DESCRIPTION OF THE PREFERRED EMBODIMENTS

Figure 1:
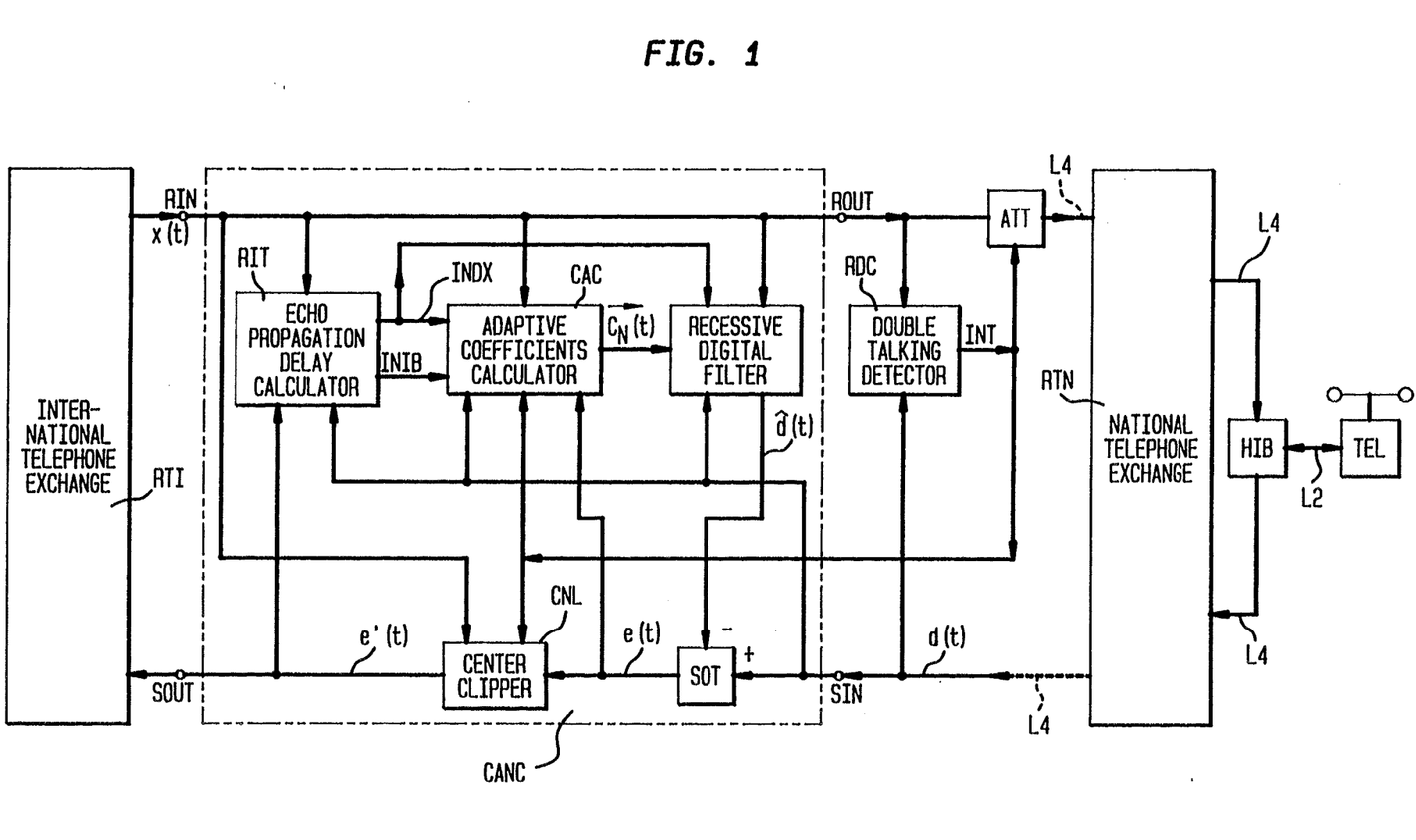
FIG. 1 shows a functional block diagram of the echo canceller which is the object of the present invention.

With reference to FIG. 1 there may be seen an echo canceller CANC which is the object of the present invention located near an international telephone exchange RTI and placed in series with a 4-wire telephone line which connects said exchange to a national exchange RTN.

The 4-wire line L4 is connected through the exchange RTN to a hybrid coil HIB which in turn is connected to a telephone set TEL by a 2-wire line L2.

The echo canceller CANC has four terminals designated Rin, Rout, Sin and Sout having the following meanings.

The terminal Rin is the input of a signal x(t) which represents the voice of the far-end talker.

The terminal Rout is the output of said signal x(t).

The terminal Sin is the input of a signal d(t) which can be either the voice of the near-end talker or the echo of the signal x(t) or both superimposed.

The terminal Sout is the output of a signal e'(t) which represents either the voice of the near-end talker or, as will be better explained below, a residual echo of the signal x(t).

In the case under examination all the signals indicated in the figures are digital, therefore the temporal variable (t) is a discrete variable which undergoes increments of 125 $\mu$s each equal to the period P of the sampling frequency of the signals x(t) and d(t).

The terminals Rin and Sout of the canceller CANC are connected to the international telephone exchange RTI.

On the connection between the terminal Rout of CANC and the reception side of the line L4 (with reference to the exchange RTN) there is inserted an attenuator ATT. The terminal Rout is also connected to an input of a double talking detector block RDC.

The terminal Sin is connected to the other input of the block RDC and to the transmission side of the line L4 (with reference to the exchange RTN).

When the block RDC detects on the line L4 the simultaneous presence of voice signals from both talkers, it generates a signal INT which disables the canceller CANC and inserts the attenuator ATT.

The echo canceller CANC is functionally divisible in the blocks (a) a recursive digital filter FTR with adaptive coefficients which produces a signal $\hat{d}(t)$ which is an estimate of the echo $d(t)$, (b) a block CAC which calculates the adaptive coefficients of the filter FTR by means of an appropriate adaptation algorithm, (c) a subtractive block SOT which subtracts the estimated echo from the actual echo, (d) a block RIT which calculates the echo propagation delay d(t) where by propagation delay is meant the total delay existing between the signal x(t) at the output Rout of the canceller and the signal d(t) at its input Sin, and (e) a block CNL designated 'center clipper' which can be considered a special case of echo suppressor accomplished in accordance with known techniques.

The voice signal x(t) coming from the exchange RTI reaches the terminal Rin and thence reaches a first input of the blocks RIT, CAC, FTR and CNL.

The echo signal d(t) coming from the exchange RTN reaches the terminal Sin and thence reaches a first input of the block SOT indicated in the figures by the symbol (+) and a second input of the blocks RIT, FTR and CAC.

At the output of the block FTR there is the estimated echo signal $\hat{d}(t)$ which reaches the second input of the block SOT indicated in the figures by the symbol (−).

At the output of the block SOT there is an error signal e(t) which reaches a second input of the block CNL and a third input of the block CAC.

To a third input of the block FTR coming from the output of the block CAC there reaches a plurality of signals indicated in the figures by the vectorial symbol $\vec{C}_N(t)$. Said plurality comprises the adaptive coefficients of the filter FTR, N being their number.

The signal INT coming from the output of the block RDC arrives at the third input of the block CNL and the fourth input of the block CAC.

The signal e'(t) coming from the output of the block CNL reaches the third input of the block RIT and the terminal Sout of CANC. At the two outputs of the block RIT are present two signals designated INDX and INIB. The signal INIB is directed to a fifth input of the block CAC, The signal INDX which represents the propagation delay expressed as the number of intervals of duration 125 μs each is directed toward a sixth input of the block CAC and to a fourth input of the block FTR.

In operation let us suppose for the sake of simplicity the voice of a single far-end talker and also that the echo canceller has already reached operating conditions, then examining the other cases. In the case mentioned the signal INT is not present and the attenuator ATT lets pass the signal x(t) unchanged to the exchange RTN whence it continues to the hybrid coil HIB and the telephone TEL.

As mentioned above the hybrid coil HIB reflects a fraction of the signal x(t) on the line L4 again to the exchange RTN. Said signal fraction reaches the terminal Sin of the echo canceller CANC and is indicated in the figures as an echo signal d(t).

The filter FTR performs the estimate $\hat{d}(t)$ of the echo d(t) and sends it to the subtractor SOT which in turn subtracts it from the actual echo d(t) to obtain the error signal $e(t) = d(t) - \hat{d}(t)$, also termed 'residual echo'.

The block CNL is a residual echo silencing device which compares the residual echo samples e(t) with a threshhold value dependent upon the level of the signal x(t). If the comparison shows that e(t) exceeds said fraction of x(t) the signal e(t) passes unchanged from the block CNL reaching the terminal Sout of the canceller; otherwise it is completely suppressed.

The filter FTR uses in the canceller which is the object of the present invention a recurrent filter with adaptive coefficients whose transfer function have poles and zeros. Said filter also comprises a known delaying circuit which delays the voice samples x(t) for time $t' = t - \text{INDX}$.

Said filter is accomplished in accordance with the known art for the design of digital filters and has two filtering sections designated respectively forward predictor and backward predictor both of which have adaptive coefficients calculated by the block CAC. The adaptation algorithm will be explained entirely in the detailed description of the operation of the block CAC given with reference to FIG. 2.

The estimate signal $\hat{d}(t)$ is obtained by a convolution process between the impulse response of the filter FTR and the inputs x(t) and d(t) in the manner indicated in the following formula.

$$\hat{d}(t) = \sum_{k=1}^{N_1} a_k x(t' - k) - \sum_{k=1}^{N_2} b_k d(t - k) \tag{1}$$

where $a_k$ indicates the adaptive coefficients of the forward predictor in the number $N_1$, $b_k$ those of the backward predictor in the number $N_2$, $x(t'-k)$ the delayed voice samples of the far-end talker and $d(t-k)$ the actual echo samples.

In the canceller described as an example there was adopted a filter FIR of the tenth order, consequently the numbers $N_1$ and $N_2$ are both equal to 10.

The estimate of the echo signal $\hat{d}(t)$ can be expressed in a more compact manner using the following vecatorial symbols:

$$\hat{d}(t) = \vec{C}_N^T(t) \vec{X}_N(t) \tag{2}$$

where $\vec{C}_N^T(t)$ is the transposed vector of the adaptive coefficients $a_k$ and $b_k$, $N = N_1 + N_2$, T is the generic transposition operator and $\vec{X}_N(t)$ is the vector which represents the entirety of the samples $x(t'-k)$ and $d(t-k)$ which is known as a vector of the input signal of the adaptive canceller. Said vector is calculated by the delaying circuit included in the filter FTR.

The vectors $\vec{C}_N(t)$ and $\vec{X}_N(t)$ are expressed as follows.

$$\vec{C}_N(t) = \begin{bmatrix} c_1 \\ c_2 \\ \cdot \\ \cdot \\ \cdot \\ c_{N_1} \\ c_{N_1+1} \\ c_{N_1+2} \\ \cdot \\ \cdot \\ \cdot \\ c_N \end{bmatrix} = \begin{bmatrix} a_1 \\ a_2 \\ \cdot \\ \cdot \\ \cdot \\ a_{N_1} \\ b_1 \\ b_2 \\ \cdot \\ \cdot \\ \cdot \\ b_{N_2} \end{bmatrix}; \quad \vec{X}_N(t) = \begin{bmatrix} x(t'-1) \\ x(t'-2) \\ \cdot \\ \cdot \\ \cdot \\ x(t'-N_1) \\ d(t-1) \\ d(t-2) \\ \cdot \\ \cdot \\ \cdot \\ d(t-N_2) \end{bmatrix} \quad (3)$$

The above discussion shows clearly that if the filter FTR obtains a good estimate of the echo d(t) even in the presence of phase roll said echo will be effectively blanked at the output Sout of the canceller thus avoiding production of its bothersome effects on the far-end talker.

Now we shall discuss the other cases of operation of the echo canceller.

In the case where the canceller is in the initial transitory phase in the presence of the voice of the far-end talker only the block RIT calculates the propagation delay of the actual echo signal d(t).

The calculation is done by a process of correlation of the voice samples x(t) of the far-end talker with the actual echo samples d(t). Said correlation process determines the point of maximum resemblance of these two signals and thus identifies the propagation delay.

During the calculation there is sent to the block CAC the signal INIB which causes zeroing of the vector of the adaptive coefficients $\vec{C}_N(t)$; otherwise in this phase the calculation algorithm would have a longer convergence time.

When the calculation is finished the block RIT removes the signal INIB and sends to the block CAC the signal INDX.

In addition during rated operation of the canceller the block HIT holds the residual echo e'(t) output from the center clipper CNL under constant observation. If it exceeds a certain predetermined threshhold it recalculates the propagation delay.

Now we shall examine the case in which there is present the voice of the far-end talker and/or the near-end talker's.

This condition is detected by the block RDC which keeps under constant observation the signals x(t) and d(t) comparing them appropriately with each other.

Supposing that the hybrid coil HIB attenuates the echo signal by at least 6 dB, if the difference of level between the signals x(t) and d(t) is less than 6 db it means that on the line L4 there is either the simultaneous presence of the voices of the remote and near-end talkers or the presence of voice of the near-end talker only. Under these conditions, since the signal e(t) used by the block CAC would be basically voice of the near-end talker, the signal INT becomes active and zeros the coefficients $a_k$ and $b_k$, interrupting the silencing of the residual echo to avoid cutting off said voice.

Figure 2:
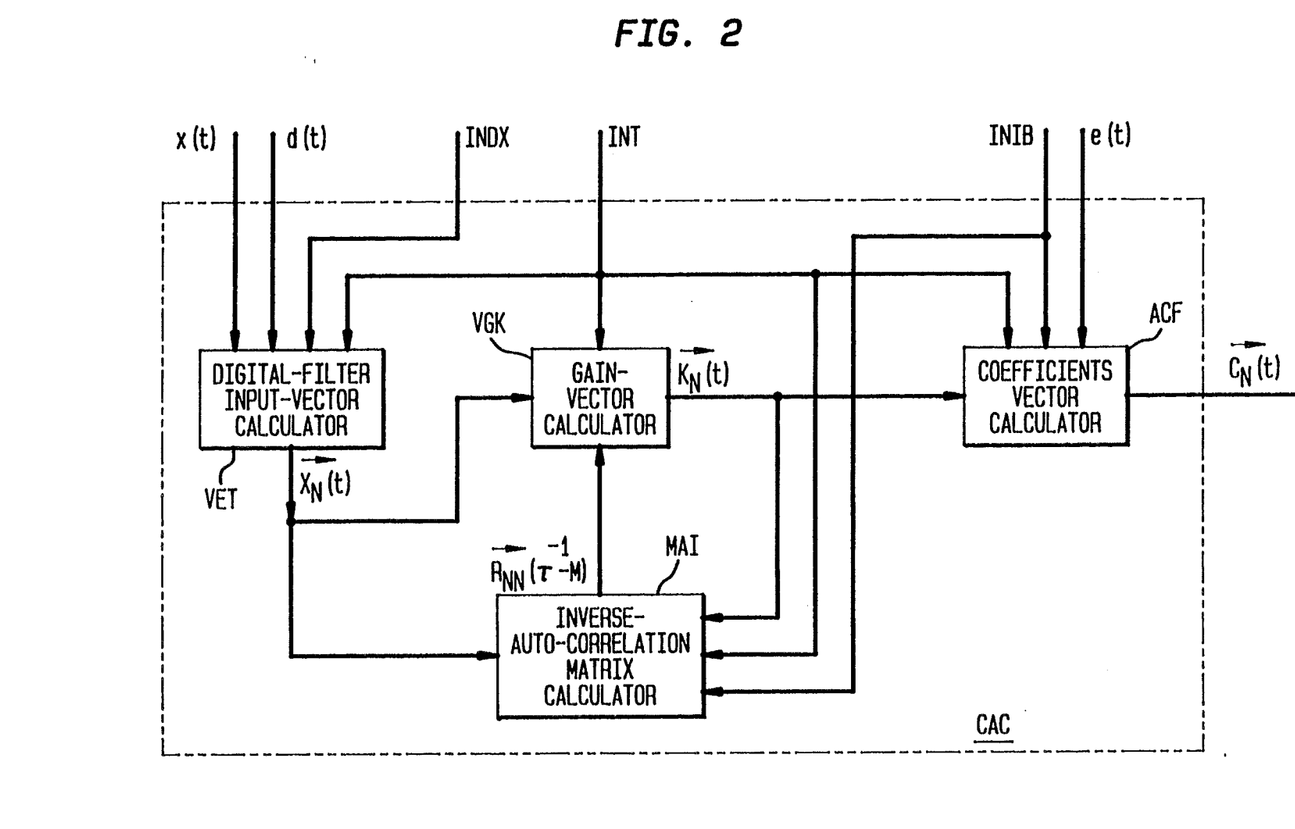
FIG. 2 shows in greater detail the block designated by CAC in FIG. 1, and FIGS. 3, 4 and 5 are flow charts of the program for the echo canceller shown in FIG. 1.

With reference to FIG. 2 where the same signals of FIG. 1 are indicated by the same symbols we see the block CAC which calculates the adaptive coefficients of the filter FTR of FIG. 1. It consists of a block VET which calculates a vector $\vec{X}_N(t)$ identical with the input vector calculated by the filter FTR, a block MAI which calculates a matrix indicated by $\vec{R}_{NN}^{-1}(\tau\text{-M})$ hereinafter defined as the inverse autocorrelation matrix of the vector $\vec{X}_N(t)$ (the meaning of the temporal variable $\tau$ will be explained below), a block VGK which calculates a vector $\vec{K}_N(t)$ called hereinafter Kalman's gain vector, and lastly ACF which calculates the vector of the coefficients $\vec{C}_N(t)$.

The signals x(t), d(t) and INDX reach the same number of inputs of the block VET which delays the samples of x(t) in relation to those of d(t) by a number of sampling periods expressed by INDX to output the vector $\vec{X}_N(t)$. Said vector is placed at a first input of the blocks VGK and MAI.

In view of the above it can be understood how the functions of the delaying circuit included in the filter FTR can actually be performed by the block VET.

The output of the block VGK is the vector $\vec{K}_N(t)$ which reaches a first input of the block ACF and a second input of the block MAI. The output of the block MAI is the matrix $\vec{R}_{NN}^{-1}(\tau\text{-M})$ placed at a second input of the block VGK.

The signal (e)t reaches a first input of the block ACF whose output is the vector of the coefficients $C_N(t)$. The signal INIB reaches both a second input of the block ACF, causing zeroing of said vector of the coefficients, and a third input of the block MAI causing initializing of the matrix $R_{NN}^{-1}(\tau\text{-M})$.

The signal INT reaches an input of all the blocks belonging to the block CAC and disables their operation.

The adaptation algorithm of the coefficients was developed in an innovative manner starting from a known algorithm such as conventional Kalman. A detailed description of Kalman is given for example on pages 413–417 of the book entitled 'Digital Communication' by John G. Proakis published by International Student Editions.

The optmization criterion of the coefficients on which is based the Kalman algorithm is minimization of the mean square error or of the power of the residual echo e(t).

Kalman's algorithm has a reduced convergence time approximately equal to N×P where N is the number of the adaptive coefficients and P is the sampling frequency period of the signals x(t) and d(t).

On the other hand adaptation of the coefficients involves considerable complexity of calculation and consequently long processing time.

To overcome this drawback the innovative criterion defined above 'decimation of the square error' was introduced in the calculation of the adaptive coefficients.

In view of the above the blocks VGK, MAI and ACF update their outputs at each iteration. But the block VET updates the vector $\vec{X}_N(t)$ at each sampling period P because decimation of the square error and not of the voice signal of the talker is made.

Decimation brings the benefit of reducing by a factor M a considerable part of the arithmetical operations performed by Kalman's algorithm in each sampling interval, allowing great simplification of the circuits which perform it. It simultaneously reduces by approximately one factor M the convergence speed of Kalman's algorithm but this drawback is overcome by the fact that the convergence speed is very high.

M=3 was chosen as a value allowing compensation of a 4 Hz phase roll and implementation of several echo cancellers with a single microprocessor specialized in digital-signal processing.

The decimated mean square error represented by $\epsilon(t)$ is expressed in the following manner:

$$\epsilon(t) = \sum_{n=iM}^{t} \lambda^{\tau-n} [d(n) - \hat{d}(n)]^2 = \sum_{n=iM}^{t} \lambda^{\tau-n} e^2(n) \quad (4)$$

$i = 0, 1, 2, \ldots, IN[t/M]$ where the symbol IN[ . . . ] means the entire t/M part, M is the factor of decimation and increase of the discretized time variable n, $\tau = M \times IN[t/M]$, $\lambda$ is a decay factor between 0 and 1 which permits following the rapid variations in time of the characteristics of the echo channel. For example for t=6 and M=3 we have:

$$\epsilon(6) = \lambda^6 e^2(0) + \lambda^3 e^2(3) + \lambda^0 e^2(6)$$

Minimization of the decimated mean square error $\epsilon(t)$ is obtained by making equal to zero its partial derivative made in relation to the adaptive coefficients N. This operation leads to a linear system which, omitting all the mathematical passages known per se, is expressed by the following equation known as the Wiener-Hopf equation:

$$\vec{R}_{NN}(t) \vec{C}_N(t) = \vec{a}_N(t) \quad (5)$$

where $\vec{C}_N(t)$ indicates the vector of the adaptive coefficients $a_k$ and $b_k$, $\vec{R}_{NN}(t)$ indicates the following autocorrelating matrix of the input vector $\vec{X}_N(t)$:

$$\vec{R}_{NN}(t) = \sum_{n=iM}^{t} \lambda^{\tau-n} \vec{X}_N(n) \vec{X}_N^T(n) \quad (6)$$

$i = 0, 1, 2, \ldots, IN[t/M]$ and $\vec{a}_N(t)$ indicates a cross correlation vector between the input signal $\vec{X}_N(t)$ and the actual echo signal d(t). The vector $\vec{a}_N(t)$ is expressed as follows:

$$\vec{a}_N(t) = \sum_{n=iM}^{t} \lambda^{\tau-n} d(n) \vec{X}_N(n) \quad (7)$$

$i = 0, 1, 2, \ldots, IN[t/M]$

The solution of equation (5) is as follows:

$$\vec{C}_N(t) = \vec{R}_{NN}^{-1}(t) \vec{a}_N(t)$$

where $\vec{R}_{NN}^{-1}(t)$ is the inverse autocorrelation vector of the input $\vec{X}_N(t)$ which enjoys the symmetry property with repect to the principal diagonal.

The algorithm seeks iteratively the solution to the equation (5), thus avoiding solving the system of N equations expressed by (8) at each new block of M samples of $\vec{X}_N(t)$ received by the block CAC.

It assumes knowledge of the solution of the equation (8) at instant $\tau$-M and therefrom is derived the following solution at instant t calculated by the block ACF:

$$\vec{C}_N(t) = \vec{C}_N(\tau-M) + \vec{K}_N(\tau) e(\tau) \quad (9)$$

The term $\vec{K}_N(\tau)$ is an N-dimensional vector called Kalman's gain vector and defined as:

$$\vec{K}_N(t) = \frac{\vec{R}_{NN}^{-1}(\tau - M) \vec{X}_N(\tau)}{\lambda^M + \vec{X}_N^T(\tau) \vec{R}_{NN}^{-1}(\tau - M) \vec{X}_N(\tau)} \quad (10)$$

where $\vec{R}_{NN}^{-1}(\tau\text{-M})$ is the inverse autocorrelation matrix of the input vector $\vec{X}_N(t\text{-M})$ calculated recursively using the following expression:

$$\vec{R}_{NN}^{-1}(t) = \frac{1}{\lambda^M} \{\vec{R}_{NN}^{-1}(\tau - M) - \vec{K}_N(\tau) \vec{X}_N^T(\tau) \vec{R}_{NN}^{-1}(\tau - M)\} \quad (11)$$

For the congruity of the entire iterative process expressed in (9), (10) and (11) there is initialized in a nonlimiting manner both the vector of the adaptive coefficients zeroing its elements and the autocorrelation matrix zeroing all its elements excepting those belonging to the principal diagonal placed at a very small value to ensure nonsingularity of the matrix.

As can be seen in (9) the present value of the coefficients is obtained by adding to the value they have at a certain prior instant the present value (t), a correction step given by $\vec{K}_N(\tau) \cdot e(\tau)$.

Figure 3:
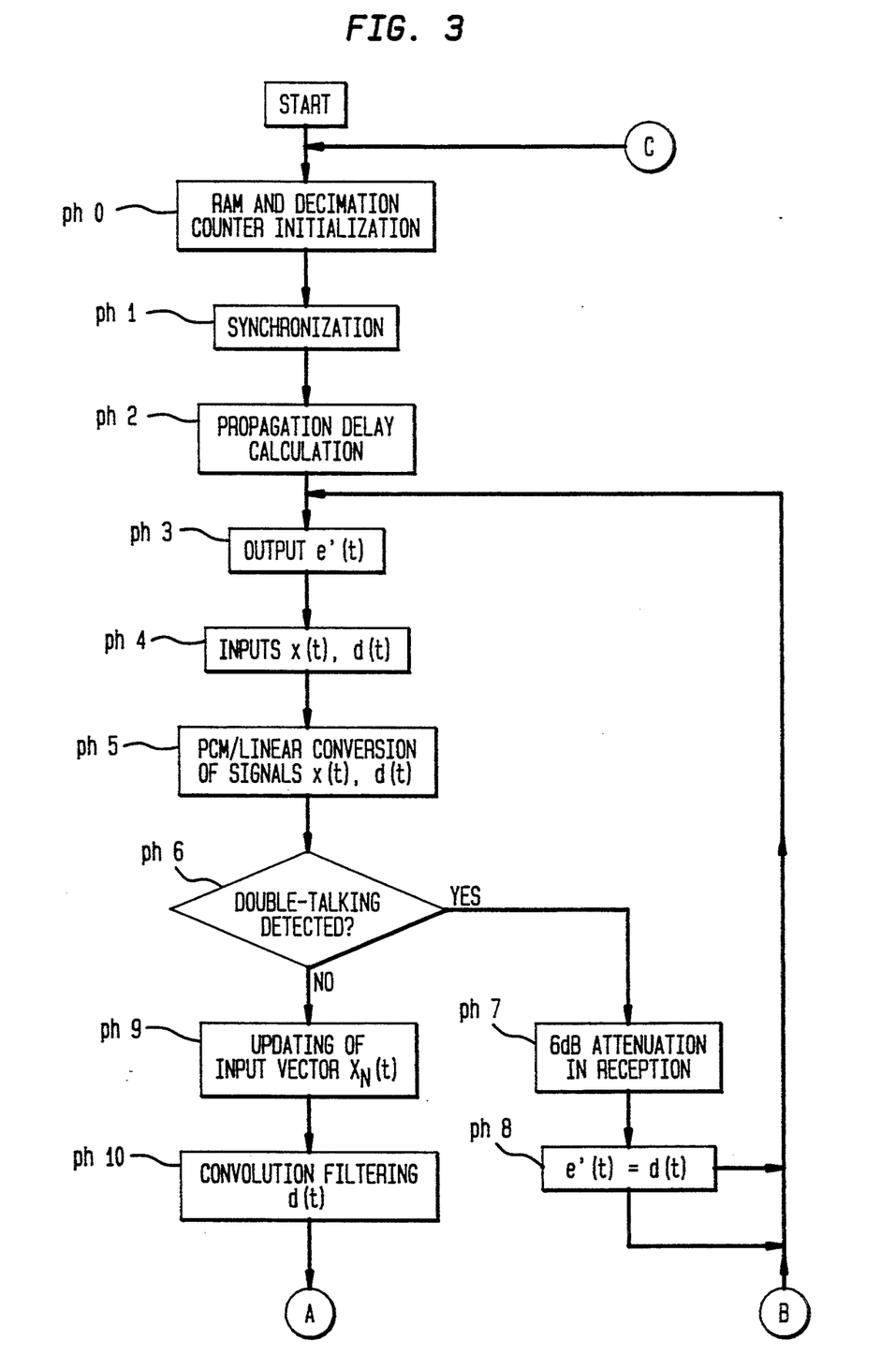
Figure 4:
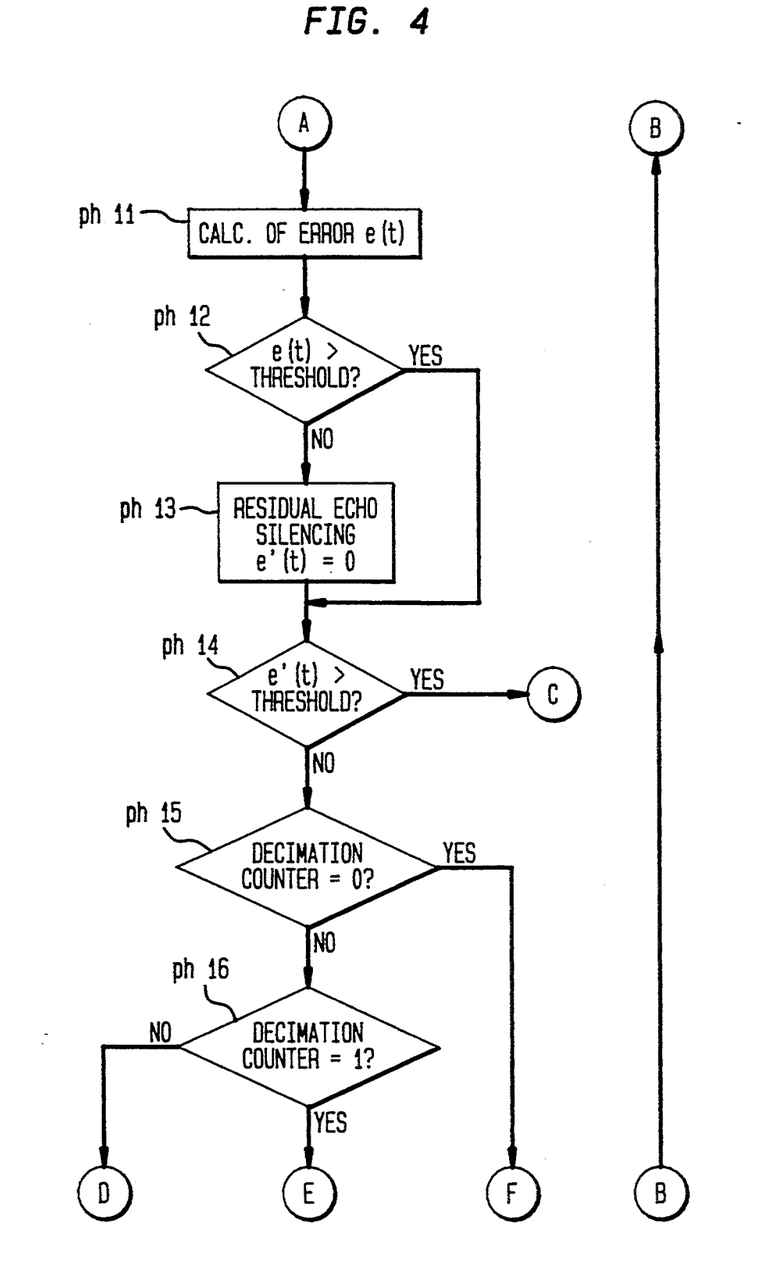
Figure 5:
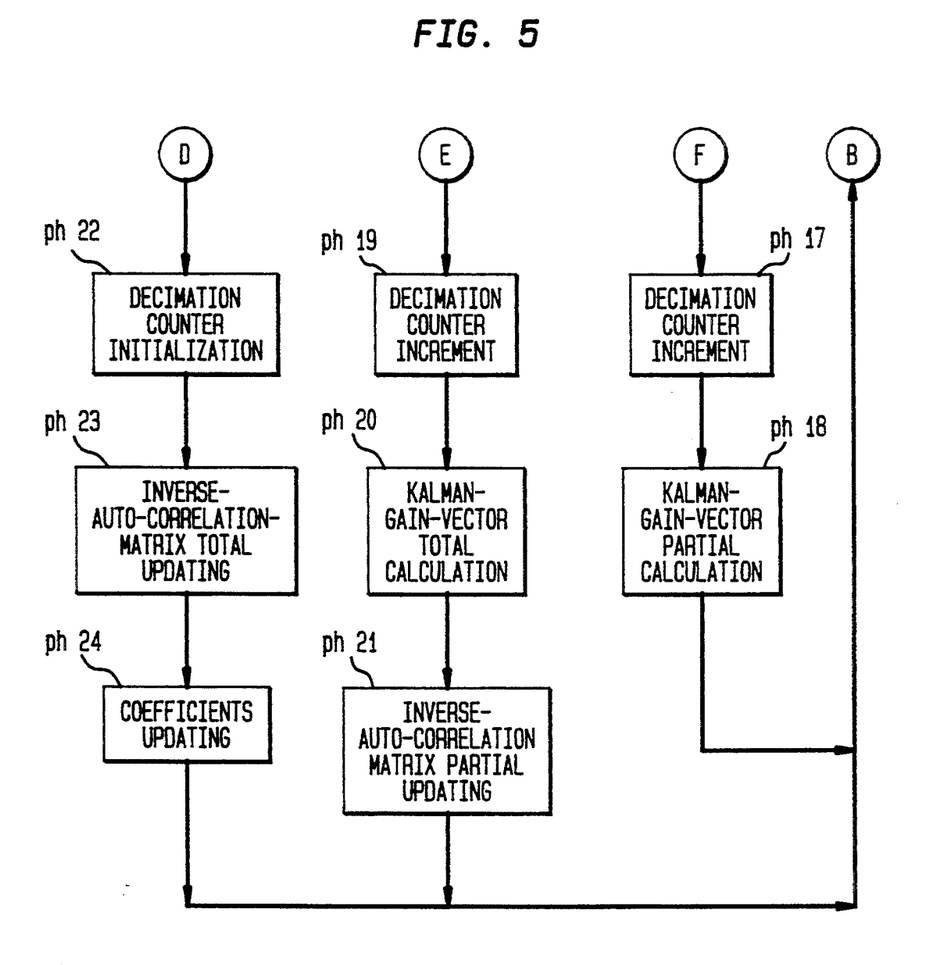

The functional blocks of the echo canceller described above are best implemented via software operations in a microprocessor-controlled system. The microprocessor used to implement the echo canceller in the exemplary embodiment is the NEC $\mu$PD77230, or equivalent, which is best suited for the arithmetic complexity of the canceller; it operates in 32 bit floating-point (8 bit exp, 24 bit mantissa) arithmetic and includes a parallel multiplier able to multiply two 32 bit operands, obtaining a 55 bit product added to the content of an accumulator register in a single instruction cycle of 150 ns. Those skilled in the field of computer implementation of digital signal processing can readily practice the present invention starting from the knowledge of the data sheets and the software manual of the microprocessor taken in conjunction with the teaching of the present invention, including, for example, the flowchart of the echo canceller operation as herein set forth in detail in the context of the present invention. FIGS. 3, 4 and 5 are flow charts of the sequence of operations performed by a microprocessor specialized in digital signal processing and used to implement the echo canceller which is the object of the present invention.

In phase 0 (FIG. 3) are performed the operations of initialization of the reading and writing memory and of some registers of the microprocessor such as for example the square error decimation counter. In phase 1 the unit then proceeds to the synchronization operation.

In phase 2 is implemented the block RIT of FIG. 1 as regards calculation of the propagation delay of the actual echo d(t). In this phase which has a duration depending on the abovesaid delay the vector of the adaptive coefficients is zeroed.

In phases 3 and 4 are performed the operations of output of the samples e'(t) and input of the samples x(t) and d(t) respectively. In phase 5 is performed conversion of the signals x(t) and d(t) codified in PCM 8 bits compressed in accordance with law A in signals codified in linear form at 13 bits. This operation is performed by means of a conversion table contained in a read-only memory inside the microprocessor. Conversion takes place using the PCM signal to address the corresponding linear signal contained in the memory.

With phase 6 processing the unit implements the double talking detector RDC of FIG. 1. In particular in phase 6 the unit compares the two signals x(t) and d(t) and, as explained in detail in the description of the block RDC, detects the double talking condition. If the condition is verified, in phase 7 the unit inserts a 6 dB attenuation on the receiving side, block ATT of FIG. 1 and in phase 8 inhibits silencing of the residual echo e'(t) and zeroes the vector of the adaptive coefficients, returning then to the data output phase 3. If the double talking condition is not verified it means that there is voice only of the far-end talker and in this case the unit continues to process the subsequent phases.

In phase 9 the unit updates the vector $\vec{X}_N(t)$ of the input samples, formula (3), eliminating the samples $x(t'-N_1)$ and $d(t-N_2)$, moving the remaining samples one position and inserting the sample $x(t'-1)$ at the head of the $N_1$ voice samples of the far-end talker and the sample $d(t-1)$ at the head of the $N_2$ actual echo samples to be processed.

In phase 10 the microprocessor implements the recursive convolution filter FIR of FIG. 1 to obtain the estimated echo $\hat{d}(t)$ in accordance with formula (2).

In phase 11 (FIG. 4) the unit calculates the residual echo, or error signal e(t), from the difference between the actual echo d(t) and the estimated echo $\hat{d}(t)$, block SOT of FIG.

By processing phases 12 and 13 the unit implements the center-clipper CNL of FIG. 1. In particular in phase 12 the unit compares the signal e(t) with an appropriate threshhold depending on the signal x(t). If e(t) is less than said threshhold, in phase 13 there is created silencing of the residual echo. Otherwise the programme goes directly from phase 12 to phase 14, bypassing phase 13, to allow the signal e(t) to pass unchanged to the output of the canceller.

In phase 14 is performed another function of the block RIT of FIG. 1, i.e. monitoring of the signal e'(t) which comes out of the canceller. If an appropriate fraction of the signal x(t) is less than the value of the samples of e'(t) there is a leap to phase 0 which reinitializes the unit and recalculates the propagation delay because very probably it is considerably changed. If the previous condition is not verified the programme goes into phase 15.

It is useful to remember that, because of processing complexity, calculation of Kalman's N-dimensional gain vector, updating of the inverse autocorrelation matrix of the order N×N and updating of the N-dimensional vector of the adaptive coefficients, is completely performed only at each iteration including the M=3 consecutive sampling intervals of duration 125 $\mu$s each designated frames 0, 1 and 2 respectively.

The above calculations performed by the programme in phases 17 to 24 inclusive are equally divided between the three frames. At the end of the processing for a generic frame the program returns cyclically to phase 3 (FIG. 3).

Phases 15 and 16 (FIG. 4) are tests of the content of the decimation counter designed to establish in which of the frames the program has arrived.

In frame 0 of the ith iteration the microprocessor increments the decimation counter, phase 17 (FIG. 5), so that the following work frame will be frame 1 of the same iteration and proceeds in phase 18 of the current frame with the partial calculation of Kalman's gain vector, performing 70% of the arithmetical operations necessary.

In frame 1 of the ith iteration the microprocessor increments the decimation counter, phase 19, so that the following work frame will be frame 2 of the same iteration and proceeds in phase 20 of the current frame to completion of the calculation of Kalman's gain vector. In the following phase 21 of said frame the unit partially updates the inverse autocorrelation matrix, performing 40% of the arithmetical operations.

In the last frame of the ith iteration the microprocessor unit initializes the decimation counter, phase 22, so that the following work frame will be frame 0 (i+1)th iteration. Then in phase 23 of the current frame it completes updating of the inverse autocorrelation matrix. In the following phase 24 of said frame the unit calculates the new value of the elements belonging to the vector of the adaptive filter coefficients by applying formula (9). Then it substitutes the old values with the present values.

From the description given the advantages of the procedure and device for adaptive digital cancellation of the echo generated in telephone connections with time-variant characteristics which is the object of the present invention are clear.

In particular they are the fact that the echo canceller obtained by said procedure estimates the echo signal by means of a recursive digital filter with adaptive coefficients which, compared with the transversal filter of conventional echo cancellers, has the double advantage of allowing a more accurate estimate and having a smaller number of coefficients to update.

The adaptation algorithm implemented has a convergence speed higher than that of the gradient algorithm used in the conventional echo cancellers, allowing the echo canceller which is the object of the present invention to maintain good performance even in the presence of a 4 Hz phase roll.

In addition the 'decimation of the square error' in the calculation of the adaptive coefficients allows simplification of the circuitry and makes it possible to obtain several echo cancellers with a single microprocessor specialized in digital signal processing.

We claim:

1. Procedure for adaptive digital cancellation of echo generated in a telephone connection by signals transmitted between a far-end talker and a near-end talker over a communications channel having characteristics varying rapidly in time, comprising the following steps:
  (a) estimating an initial propagation delay (INDX) between a sequence of digital samples of an input signal x(t) coming from a far-end talker and a sequence of digital samples of an echo signal d(t) produced by reflection of said signal x(t), wherein t is a discrete time variable, including the substep of computing a maximum correlation point between the two sequences of digital samples;
  (b) recursively digitally filtering with adaptive coefficients ($C_k$) the samples of the input signal x(t) and the echo signal d(t), wherein the samples of the input signal x(t) are delayed by the value of the estimated propogation delay INDX, said filtering producing samples $\hat{d}(t)$ of an estimation of the echo signal d(t) by multiplying a vector $\vec{C}_N(t)$ which includes the adaptive filter coefficients $C_k$, the subscript N indicating the number of coefficients of the vector, and an input vector $X_N(t)$ which includes a first number $N_1$ of delayed input signal samples x(t'), where t'=t−INDX, and a second number $N_2$ of samples of the echo signal d(t);

(c) subtracting the estimation signal d(t) from an output signal which contains the echo signal d(t) and obtaining a residual echo signal e(t);

(d) calculating a present value of a gain vector $K_N(t)$ which has coefficients determined based upon minimization of the power of the residual echo signal e(t); and (e) iteratively updating the vector of coefficients $C_N(t)$ by adding, at each iteration, to the values the vector had at a previous iteration a product of the residual echo signal e(t) and the present value of the gain vector $\vec{K}_N(t)$, wherein each iterative updating of the coefficient vector $\vec{C}_N(t)$ is accomplished in a predetermined number $M > 1$ of sample periods corresponding to the sampling of the signals x(t) and d(t).

2. Procedure for adaptive digital cancellation of the echo in accordance with claim 1 characterized in that said number $N_1$ of adaptive coefficients ($a_k$) belonging to said first group is equal to 10 and that said number $N_2$ of adaptive coefficients ($b_k$) belonging to said group delay is equal to 10.

3. Procedure for adaptive digital cancellation of the echo in accordance with claim 1 characterized in that said number M of periods of the sampling frequency of the digital signals x(t) and d(t) included in an iteration of the calculation of said vector $\vec{C}_N(t)$ of coefficients is 3.

4. Procedure for adaptive digital cancellation of the echo in accordance with claim 1, characterized in that said input vector $X_N(t)$ is obtained by:

including said $N_1$ INDX-delayed voice samples x(t'), ordered from the most recent to the remote sample, in correspondence of the elements of the vector having the index values comprised from 1 to $N_1$;

including said $N_2$ samples of the echo signal d(t), ordered from the most recent to the remote sample, in correspondence of the elements having the index values comprised from $N_1 + 1$ to N; and in that said adaptive coefficient vector $\vec{C}_N(t)$ is obtained by:

including $a_k$ first coefficients multiplying said voice samples x(t'), in correspondence of the elements of the vector having the index values comprised from 1 to $N_1$, and including in correspondence of the elements having the index values comprised from $N_1 + 1$ to N, $b_k$ second coefficients, taken with their sign-inverted value, which multiply said samples of echo signal d(t).

5. Procedure for adaptive digital cancellation of the echo in accordance with claim 1, characterized in that said initial propagation delay (INDX) of the echo signal d(t) is obtained by:

calculating it at the beginning of a new telephonic connection;

comparing the level of said residual echo signal e(t) with an appropriately determined threshold; and comparing the level of said residual echo signal e(t) with an appropriately determined threshold; and recalculating it only when said threshold has been exceeded.

6. Procedure for adaptive digital cancellation of the echo in accordance with claim 1, characterized in that the step (d) of calculating the present value of said gain vector $\vec{K}_N(t)$ is carried out by using the following expression (10):

$$\vec{K}_N(t) = \frac{\vec{R}_{NN}^{-1}(\tau - M) \vec{X}_N(\tau)}{\lambda^M + \vec{X}_N^T(\tau) \vec{R}_{NN}^{-1}(\tau - M) \vec{X}_N(\tau)}$$

where $\lambda$ indicates a decay factor whereof the numerical value is comprised between 0 and 1, $\vec{R}_{NN}^{-1}(\tau-M)$ indicators an inverse auto-correlation matrix of the input vector $\vec{X}_N(\tau)$, being T the transposition operator.

7. Procedure for adaptive digital cancellation of the echo in accordance with claim 6, characterized in that the present value of said inverse auto-correlation matrix $R_{NN}(t)$ is carried out by recursively calculating the following expression (11):

$$\vec{R}_{NN}^{-1}(t) = \frac{1}{\lambda^M} \{\vec{R}_{NN}^{-1}(\tau - M) - \vec{K}_N(\tau) \vec{X}_N^T(\tau) \vec{R}_{NN}^{-1}(\tau - M)\}.$$

8. Device for adaptive digital cancellation of echo generated in a telephone connection by voice signals transmitted between a far-end talker and a near-end talker over a communications channel having characteristics varying rapidly in time, comprising:

(a) a first input terminal ($R_{in}$) for receiving a digital input signal x(t) from a far-end talker, a first output terminal ($R_{out}$) for transmitting a digital output signal to a near-end talker, a second input terminal ($S_{in}$) for receiving a digital input signal from the near-end talker, including any echo signal d(t) generated as a result of transmitting the digital output signal to the near-end talker, and a second output terminal ($S_{out}$) for transmitting a digital output signal to the far-end talker;

(b) echo propagation delay calculating means (RIT), coupled to said first input terminal and to said second output terminal, for estimating an initial propagation delay value (INDX) between a sequence of digital samples of an input signal x(t) coming from the far-end talker and a sequence of digital samples of an echo signal d(t) produced by reflection of said signal x(t), wherein t is a discrete time variable, including subcomponent means for computing a maximum correlation point between the two sequences of digital samples;

(c) recursive digital filtering means (FTR), coupled to said first input terminal, to said second input terminal, to an output of a vector $\vec{C}_N(t)$ of adaptive filter coefficients, and to an output of said delay value INDX of said echo propagation delay calculating means (RIT), for filtering with adaptive filter coefficients ($C_k$) the samples of the input signal x(t) and the echo signal d(t), wherein the samples of the input signal x(t) are delayed by the value of the estimated propogation delay INDX, said recursive digital filtering means (FTR) producing samples d(t) of an estimation of the echo signal d(t) by multiplying a vector $\vec{C}_N(t)$ of adaptive filter coefficients $C_k$, which includes a first group ($a_k$) and a second group ($b_k$) of adaptive filter coefficients, the subscript N indicating the number of coefficients of the vector, and an input vector $\vec{X}_N(t)$ which includes a first number $N_1$ of delayed input signal samples x(t'), where t'=t−INDX, and a second number $N_2$ of samples of the echo signal d(t);

(d) subtracting means (SOT) for subtracting the estimation signal d(t) output from said recursive digital filtering means (FTR) from an output signal which contains the echo signal d(t) and obtaining a residual echo signal e(t); and (e) adaptive coefficient calculating means (CAC), coupled to said first input terminal, to outputs of said echo propagation delay calculating means (RIT), to an output of said residual echo signal e(t) of said subtracting means (SOT), and to said second input terminal, and including first subcomponent/means (VGK) for calculating a present value of a gain vector $\vec{K}_N(t)$ which has coefficients determined based upon minimization of the power of the residual echo signal e(t), and second subcomponent means (ACF) for iteratively updating the vector of coefficients $C_N(t)$ by adding, at each iteration, to the values the vector had at a previous iteration a product of the residual echo signal e(t) and the present value of the gain vector $\vec{K}_N(t)$, wherein each iterative updating of the coefficient vector $C_N(t)$ is accomplished in a predetermined number M>1 of sample periods corresponding to the sampling of the signals x(t) and d(t), in order to provide an output of said iterative updated vector $C_N(t)$ to said recursive digital filtering means (FTR).

9. Device for adaptive digital cancellation of the echo in accordance with claim 8 above characterized in that said number M of periods of the sampling frequency of the digital signals x(t) and d(t) included in an iteration of the calculation of said vector $\vec{C}_N(t)$ of coefficients is equal to 3.

10. Device for adaptive digital cancellation of the echo in accordance with claim 8 characterized in that said second subcomponents means (ACF) organizes said vector of the coefficients $\vec{C}_N(t)$ so as to include a number $N_1$ of adaptive coefficients belonging to said first group ($a_k$) placed in decreasing temporal order and a number $N_2$ of adaptive coefficients belonging to said second group ($b_k$) placed in decreasing temporal order.

11. Device for adaptive digital cancellation of the echo in accordance with claim 10 above characterized in that said number $N_1$ of adaptive coefficients ($a_k$) belonging to said first group is equal to 10 and that said number $N_2$ of adaptive coefficients ($b_k$) belonging to said second group is equal to 10.

12. Device for adaptive digital cancellation of the echo in accordance with claim 10 above characterized in that it includs a third subcomponent means (VET) which calculates said input vector $\vec{X}_N(t)$ of the digital filter (FTR) at whose inputs arrive the samples of said echo signal d(t), the samples of said signal x(t) coming from a far-end talker and a signal INDX coming from said delay calculating means (RIT) which estimates the propagation delay of the echo d(t) and at whose output there is present said vector $\vec{X}_N(t)$ which includes said number $N_1$ of samples of the signal x(t) placed in decreasing temporal order after being delayed by the value of said initial propagation delay indicated by INDX and said number $N_2$ of samples of the echo signal d(t) placed in decreasing temporal order.

13. Device for adaptive digital cancellation of the echo in accordance with claim 12 above characterized in that it includes a fourth subcomponent means comprising a center clipper means (CNL) which controls the level of said residual echo signal e(t) and, when said level exceeds an appropriately determined threshold, imparts a command to said delay calculating means (RIT) which recalculates the initial propagation delay (INDX) of the echo signal d(t).

14. Device for adaptive digital cancellation of the echo in accordance with claim 13 above characterized in that said first component means receives as an input said input vector $\vec{X}_N(t)$ and a inverse auto-correlation matrix $\vec{R}^{-1}(\tau-M)$ of said vector $\vec{X}_N(t)$ evaluated in an iteration preceding the present one and calculates the present value of said gain vector $\vec{K}_N(t)$ using the following formula (10):

$$\vec{K}_N(t) = \frac{\vec{R}_{NN}^{-1}(\tau - M) X_N(\tau)}{\lambda^M + \vec{X}_N^T(\tau) \vec{R}_{NN}^{-1}(\tau - M) \vec{X}_N(\tau)}$$

where the symbol IN [ . . ] means the entire part of t/M, $\tau = M \times$ IN [t/M], $\lambda$ indicates a decay factor between 0 and 1, $\vec{X}_N T(\tau)$ being the transposed vector of $\vec{X}_N(\tau)$.

15. Device for adaptive digital cancellation of the echo in accordance with claim 14 above characterized in that it includes a fourth subcomponent means (MAI) which receives as an input said input vector $\vec{X}_N(t)$ and said gain vector $\vec{K}_N(t)$ and outputs said inverse auto-correlation matrix $\vec{R}_{NN}^{-1}(t)$ whose present value is calculated recursively using the following expression (11):

$$\vec{R}_{NN}^{-1}(t) = \frac{1}{\lambda^M} \{\vec{R}_{NN}^{-1}(\tau - M) - \vec{K}_{NN}(\tau) \vec{X}_N^T(\tau) \vec{R}_{NN}^{-1}(\tau - M)\}.$$

* * * * *